United States Patent [19]

Ross

[11] 3,866,152

[45] Feb. 11, 1975

[54] HIGH FREQUENCY PLANAR NETWORK WITH NON-RADIATING CIRCUIT ELEMENTS

[75] Inventor: Gerald F. Ross, Lexington, Mass.

[73] Assignee: Sperry Rand Corporation, Great Neck, N.Y.

[22] Filed: June 28, 1973

[21] Appl. No.: 374,299

[52] U.S. Cl. .................... 333/20, 307/106, 328/65, 333/9, 333/84 M

[51] Int. Cl. .................... H01p 1/00, H01p 5/00

[58] Field of Search .............. 333/20, 1, 6, 9, 84 M; 307/106, 268; 328/57, 65, 38, 61

[56] References Cited

UNITED STATES PATENTS

| | | | |
|---|---|---|---|
| 2,836,798 | 5/1958 | Levine | 333/84 M X |
| 3,471,808 | 10/1969 | Felsenheld et al. | 333/1 |
| 3,760,283 | 9/1973 | Lockwood | 333/20 X |

*Primary Examiner*—Paul L. Gensler
*Attorney, Agent, or Firm*—Howard P. Terry

[57] ABSTRACT

A time-limited strip transmission line network includes non-radiating open-circuited stub filter network elements in a configuration adaptable for employment in a timing standard signal generator for producing sub-nanosecond duration output impulse signals.

5 Claims, 6 Drawing Figures

HIGH FREQUENCY PLANAR NETWORK WITH NON-RADIATING CIRCUIT ELEMENTS

BACKGROUND OF THE INVENTION

1. Field of the Invention

The invention pertains to pulse network means for producing very short duration electromagnetic base band pulses and more particularly concerns time-limited strip transmission line networks including non-radiating branching filter network elements in strip transmission line configurations that are manufacturable using available and commercially successful techniques such as those normally used for fabricating conventional planar transmission line circuits.

2. Description of the Prior Art

The prior art has provided suitable networks for employment in base band impulse generators in the form of coaxial transmission line networks, as will be discussed in the following specification in connection with FIGS. 1 and 2. These networks either use open-circuited filter elements which undesirably radiate considerable energy or, if provided with energy coupling elements of a nature preventing such radiation, are not adaptable to generation of analogous planar transmission line forms. There has, therefore, been an unsatisfied need in the art for a non-radiating network of the planar strip transmission line type for use in base band impulse generators.

SUMMARY OF THE INVENTION

The present invention is a pulse forming network capable of generating base band duration impulses of nanosecond or subnanosecond duration for timing standard purposes and incorporating non-radiating planar strip transmission line filter elements in configurations that may be built using only conventional planar strip transmission line constructional techniques.

DESCRIPTION OF THE PREFERRED EMBODIMENTS

In the search for adequate generators of short-duration, high frequency content pulse signals, especially for the production of sharp base-band signals of sub-nanosecond duration, prior research has produced pulse-forming network arrangements employing excitation in the TEM-mode type of electromagnetic wave propagation. These networks have time-limited response characteristics in response to a gated pulse or to pulse modulated high frequency inputs and are discussed in the U.S. Pat. No. 3,612,899 to G. F. Ross and J. D. DeLorenzo for a "Generator of Short-Duration High-Frequency Pulse Signals," issued Oct. 12, 1971 and assigned to the Sperry Rand Corporation. They include devices of the types shown in FIGS. 1 and 2.

Figure 1:
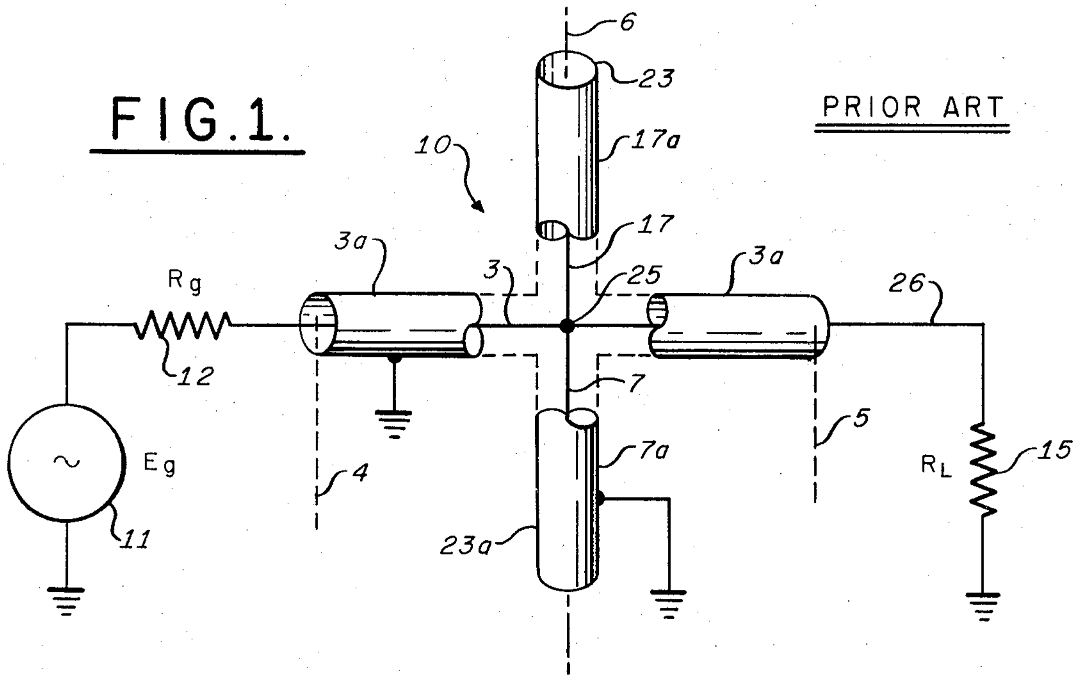
FIG. 1 is a partially schematic top view of a prior art device.

In the device of FIG. 1, there is provided an internally pulsed modulated generator 11 having an internal resistance $R_g$ represented by resistor 12. A pulse to be processed is supplied by generator 11 and travels through pulse forming network 10 to arrive as a base band pulse at a resistive or terminating load 15, which may be a radiating antenna or other matched utilization device. Load 15 has a resistance $R_L$. Generator 11 is coupled at reference plane 4 to a coaxial transmission line network 10, whose output impulse wave is coupled at reference plane 5 to load 15.

In FIG. 1, pulse forming network 10 is conveniently formed of available coaxial transmission line elements to form a cross-shaped configuration. Network 10 includes a main coaxial transmission line 3, 3*a* whose center conductor 3 is connected serially to generator 11 and to the terminal load 15. The second or opposite lead of generator 11 and of load 15 are each grounded, as is the outer conductor 3*a* of line 3, 3*a*. The network 10 is formed with radially or oppositely branched coaxial line conductor elements 7, 7*a* and 17, 17*a*. The latter are shown cut away at junction 25 lying in reference plane 6 to emphasize the joint connection at junction 25 of inner conductors 7 and 17 to inner conductor 3 of the main transmission line 3, 3*a*. Outer coaxial conductors 7*a*, 17*a*, being electrically connected to outer conductor 3*a* as indicated by the dotted lines in FIG. 1, are also at ground potential.

Figure 2:
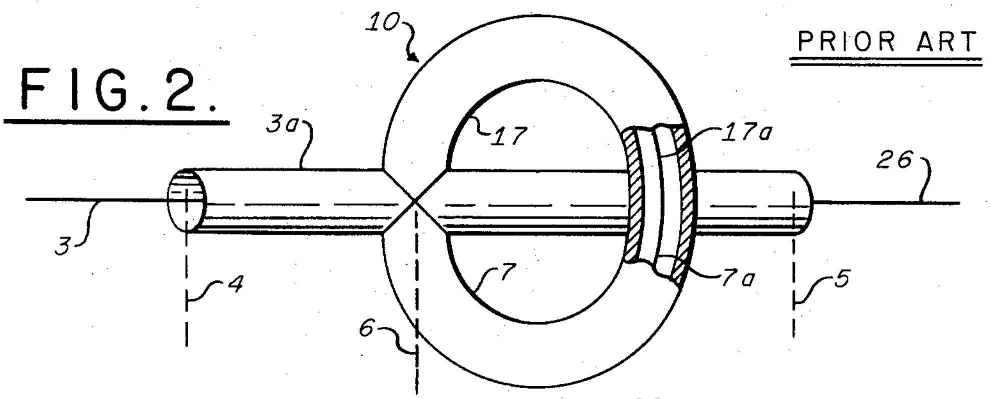
FIG. 2 is a partially sectioned top view of a second prior art device.

The arrangement of FIG. 1 is found to have a problem overcome by use of the variation shown in FIG. 2. The lines 7, 7*a* and 17, 17*a* of FIG. 1 employ open circuits at their ends 23, 23*a*; such open circuits are well known not to be entirely perfect, normally providing a slight impedance mismatch causing radiation of energy into space. Such radiation is an inefficient process and may also hamper proper operation of various apparatus within the radiation field.

In the arrangement of FIG. 2, the undesired radiation is eliminated. The structure of the network 10 of FIG. 2 is otherwise electrically equivalent to that of FIG. 1, but the radially extending coaxial transmission lines 7, 7*a* and 17, 17*a*, which are preferably in the form of flexible coaxial cables, are bent in a generally circular loop. In this manner, the respective formerly open-circuited ends 23, 23*a* of lines 7, 7*a* and 17, 17*a*, are connected together in directive conductive relation, as in the vertical plane including conductor 26.

Generally, operation of the arrangements of FIGS. 1 and 2 is similar, since all signals again travel the same distances in both embodiments. Those signals which return to junction 25 in FIG. 1 from the opposed stub lines along the same paths as they originally left it, now return thereto in the network of FIG. 2, along the opposite branch transmission line. In the embodiment of FIG. 2, counter-flowing signals must travel over the same paths and the output pulse duration depends beneficially on the length of a single continuous coaxial transmission line. Further, no radiation of energy can occur because of the lack of presence of the imperfect open circuits 23 or 23*a*.

In the present invention, it is desired to achieve the general results obtained with the foregoing coaxial line embodiments, but in planar circuit form using strip transmission lines. It will be apparent upon inspection of FIG. 2 that the cross-over of 7, 7*a* and 17, 17*a* does not conveniently permit a useful strip transmission line analog of the FIG. 2 device to be generated. If a strip transmission line structure generally analogous to the prior art arrangement of FIG. 1 is attempted, there is still present the problem of significant leakage loss from the open circuited stub ends. In fact, this loss may be a significant fraction of the total loss of high frequency energy.

Figure 3:
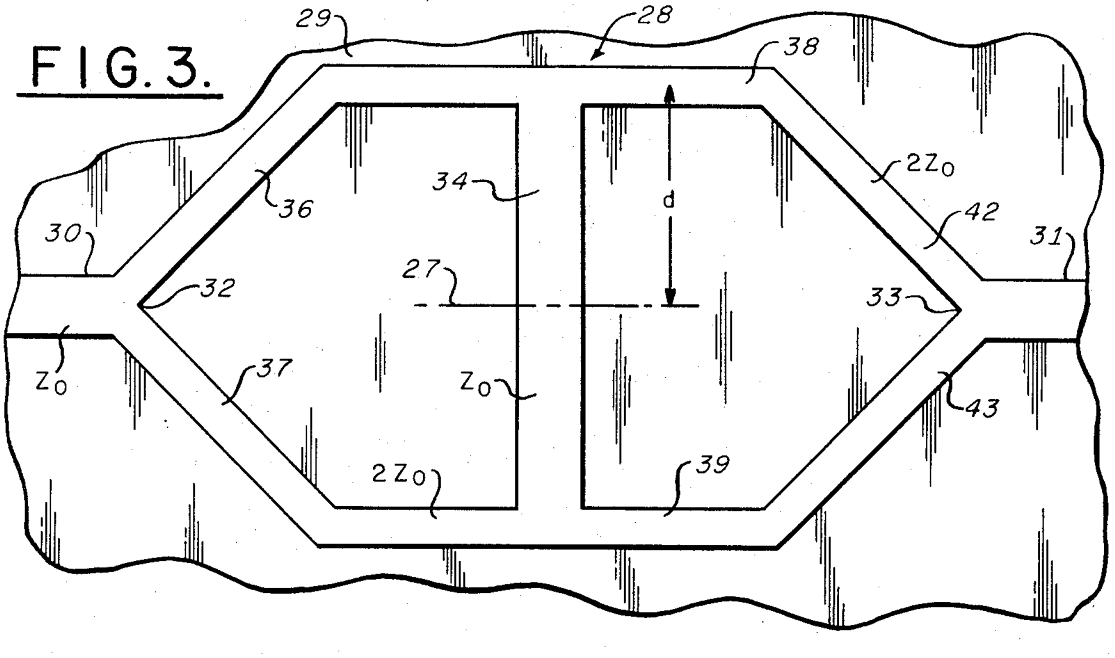
FIG. 3 is a fragmentary plan view of a network according to the present invention.
Figure 5:
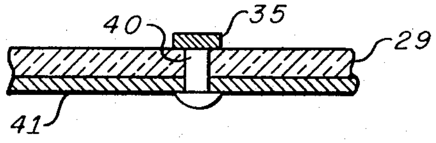
FIG. 5 is a partial elevation cross section view taken along the line 5—5 of FIG. 4.

The novel arrangement of FIG. 3 is a preferred solution to the problem. The strip transmission line network 28 of FIG. 3 is constructed using the usual manufacturing methods on a low loss dielectric substrate 29. Substrate 29 is provided on its side opposite the network 28 (FIG. 5) with a ground plane conductor 41 of the type conventionally employed in strip transmission line devices. Opposed input and output strip transmission lines 30 and 31 are supplied. The network has reciprocal properties and lines 30, 31 may have an arbitrary impedance $Z_o$. Signal dividing junction 32 provides transmission line arms 36 and 37 branching symmetrically from the input line 30, while signal summing junction 33 provides symmetric coupling to branch lines 42 and 43 at output line 31. Normally, lines 36, 37, 42, and 43 will each have impedances $2Z_o$. The matching techniques at junctions 32 and 33 may, for example, be those taught in the G. F. Ross U.S. Pat. No. 3,646,478 for an "Energy Coupler Utilizing Directional Couplers and Delay Lines to Simultaneously Trigger Plural Charging Networks into Tree for Summing at Common Output," issued Feb. 29, 1972 and assigned to the Sperry Rand Corporation. Coupling devices having the base band propagation properties of the devices of FIGS. 1 and 2 of the Ross patent are of particular interest for use with very short duration sub-nanosecond impulses.

Connecting the branch lines 36 and 42 is a $2Z_o$ strip transmission line 38, while connecting branching lines 37 and 43 is a second $2Z_o$ strip transmission line 39 spaced substantially parallel to line 38. Using only the transmission line elements thus far described, a pulse or other signal entering network 28 at input 30 divides equally at junction 32 with no energy being reflected, travels simultaneously down lines 36, 38, 42, and 37, 39, 43, each part arriving simultaneously without reflection at junction 33 to be summed and coupled out by output transmission line 31. The parallel lines 38, 39 are spaced apart by a distance 2*d* as indicated in FIG. 3, where *d* is the equivalent prior art transmission line stub length. The lengths of lines 38 and 39 and the distance between junctions 32, 33 are not particularly critical, but are made as small as convenient in order to reduce the effects of ohmic losses in the strip transmission lines and to permit the device to be small in size.

Between the parallel lines 38, 39 is coupled a strip transmission line 34 having an impedance $Z_o$, this element cooperating with the elements 38, 39 of the divided transmission line 30, 31 to perform the function of the loop 7*a*, 17*a* of FIG. 2. Because of the divided main transmission line 30, 31, it is now possible to place line 34, the equivalent of the loop, directly on the surface of dielectric substrate 29. Thus, the loop comprising line 34 serves to provide an effective open circuit at the mid-plane 27, though the effective open circuit at 27 cannot radiate energy or otherwise produce objectionable energy reflections. The minimum value of the distance *d* is set by the necessary length of each of the effectively open circuited stubs making up transmission line 34 as required by the predetermined characteristics of network 28. In operation as a timing standard for producing a pair of base band pulses separated in time by a standard time interval, the impulse response of the device of FIG. 3 consists of two short pulses separated in time by $2d/c$ seconds. The quantity *d* is the equivalent stub length indicated in FIG. 3, while *c* is the propagation velocity in transmission line segment 34. Each of the pair of pulses has a total area of one half that of the input pulse, while the time between pulses is accurately determined by the equivalent stub length *d*.

Figure 4:
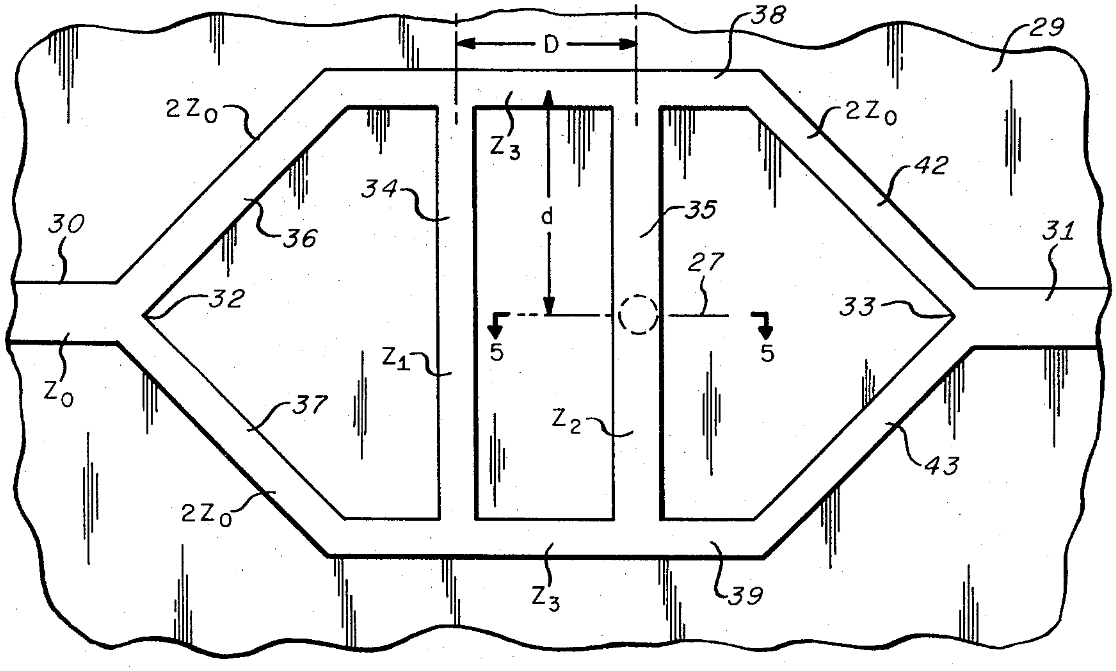
FIG. 4 is a fragmentary plan view of a second embodiment of the present invention.
Figure 6:
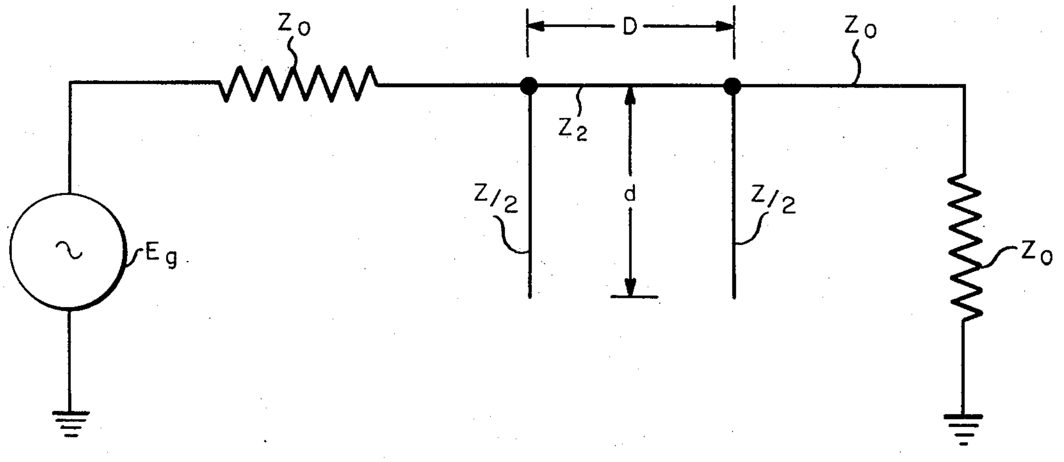
FIG. 6 is an equivalent circuit useful in explaining the operation of the invention.

In the alternative form of the invention shown in FIG. 4, of which FIG. 6 illustrates an equivalent circuit, most of the transmission line elements are similar to those of FIG. 3 and therefore bear similar reference numerals. Connecting branch lines 36 and 42 is a $2Z_o$ strip transmission line 38, while connecting branching lines 37 and 43 is a second $2Z_o$ strip transmission line 39 spaced substantially parallel to line 38. Using only the transmission line elements thus far described, a pulse or other signal entering network 28 at input 30 divides equally at junction 32 with no energy being reflected, travels simultaneously down lines 36, 38, 42, and 37, 39, 43, each part arriving simultaneously without reflection at junction 33 to be summed and coupled out by output transmission line 31 as in FIG. 3. The parallel lines 38, 39 are spaced apart by a distance 2*d* as previously defined.

Between the parallel lines 38, 39 are coupled first and second strip transmission lines 34 and 35, respectively, of a delay line filter circuit. Line 34 has an impedance of $Z_1$, which may or may not be equal to $Z_o$, while the impedance of line 35 is $Z_2$, which may also be arbitrarily chosen. Practically speaking, $Z_1$ or $Z_2$ will not exceed 150 ohms. For single frequency operation, the distance D between lines 34 and 35 will be substantially $n_{\lambda o}/4$, where $n$ will be a small integer ($n$ is one or, at the most, two) in order to make the total size of the network 28 minimum. Thus, the loop comprising lines 34, 38, 35, and 39 serves to provide an effective open circuit at the mid-plane 27, though the effective open circuit at 27 cannot radiate energy or otherwide produce objectionable energy reflections. The minimum value of the distance *d* is again set by the necessary length of each of the effectively open circuited stubs making up transmission line 34 as required by the predetermined characteristics of network 28. In the devices of FIG. 3 or 4, a pair of effectively short circuited filter stubs may alternately be achieved by coupling the mid-point of the $Z_2$ transmission line 35 through a pin or other conductor 40 to the ground plane 41, as in FIG. 5. Construction and operation of the device is generally similar to that of FIG. 4, both of the devices providing the sought-for solution to a network free of radiating open circuits, and being adapted to manufacture in the type of geometery conventionally employed in planar transmission line circuits.

While the invention has been described in its preferred embodiments, it is to be understood that the words which have been used are words of description rather than of limitation and that changes within the purview of the appended claims may be made without departure from the true scope and spirit of the invention in its broader aspects.

I claim:

1. Planar transmission line pulse forming network means comprising:

dielectric substrate means, symmetrically branching signal divider junction means affixed to one surface of said dielectric substrate means and having first and second port means and separate input means for receiving an electromagnetic pulse signal, symmetrically branching signal summing junction means affixed to said surface of said dielectric substrate means and having third and fourth port means and separate output means, and transmission line means for conductively coupling said first and second port means to said third and fourth port means for converting said received electromagnetic pulse signal into two electromagnetic pulses separated in time flowing from said signal summing junction means at said output means, said transmission line means being disposed substantially at right angles to the direction of electromagnetic energy propagation within said input and output means symmetrically therebetween.

2. Apparatus as described in claim 1 wherein the characteristic impedances of said input means, said output means, and said transmission line means are substantially equal.

3. Apparatus as described in claim 2 wherein the characteristic impedances of the branches of said symmetrically branching signal divider and summing junctions are substantially equal to twice the characteristic impedance of said transmission line means.

4. Apparatus as described in claim 1 wherein said transmission line means has a length $2d$ related to the time of separation $2d/c$ of said two electromagnetic pulses, where $c$ is the velocity of propagation of electromagnetic energy in said transmission line means.

5. Apparatus as described in claim 1 wherein the mid-point of said transmission line means is conductively coupled to ground plane means affixed to a surface of said dielectric substrate means opposite said one surface.

* * * * *